United States Patent

Wowk

[15] 3,665,025

[45] May 23, 1972

[54] ORGANO(HALO) DISULFUR TIN DERIVATIVES AND THE PROCESS OF PREPARING THE SAME

[72] Inventor: Anatole Wowk, Edison, N.J.

[73] Assignee: M & T Chemicals Inc., New York, N.Y.

[22] Filed: Dec. 29, 1969

[21] Appl. No.: 888,850

[52] U.S. Cl. .................................. 260/429.7, 260/45.75 K
[51] Int. Cl. ........................................... C07f 7/22
[58] Field of Search ............................................. 260/429.7

[56] References Cited

UNITED STATES PATENTS 3,542,825   11/1970   Hoye ................................. 260/429.7

*Primary Examiner*—Tobias E. Levow
*Assistant Examiner*—Werten F. W. Bellamy
*Attorney*—Lewis C. Brown, Kenneth G. Wheeless and Robert P. Grindle

[57] ABSTRACT

This invention comprises novel compounds exhibiting one direct carbon to tin bond, one direct halogen to tin bond and two direct sulfur to tin bonds, methods of preparing these novel compounds, and to polymers stabilized by these novel compounds against the deteriorative effects of heat and light.

18 Claims, No Drawings

ORGANO(HALO) DISULFUR TIN DERIVATIVES AND THE PROCESS OF PREPARING THE SAME

This invention relates to novel organotin compounds and to novel stabilized halogen-containing polymer compositions.

Halogen-containing polymers, including homopolymers and copolymers of vinyl chloride and vinylidene chloride, are materials which have proven useful, because of their desirable physical properties. Uses of these materials have been limited, however, by their inherent instability when exposed to conditions of heat and light. Under such conditions, the halogen-containing polymer may discolor, become brittle, crack, check, or otherwise suffer deterioration of its physical properties. Thus, unstabilized chlorine-containing polymer compositions may be highly unsatisfactory for outdoor use where they may be subjected to both heat and light. Various techniques are known for stabilizing these polymers against degradation in the presence of heat alone or light alone but no single stabilizer compound has been found which confers the high degree of both heat and light stability which is required for outdoor use.

A further defect of prior art stabilizers is that they may normally be viscous liquids or pasty gels. They may thus be considerably more difficult to handle than solid stabilizers.

It is an object of this invention to provide novel organotin compounds which may be characterized by their unexpectedly superior physical properties. It is a further object of this invention to provide novel chlorine-containing polymer compositions characterized by their high resistance to degradation during outdoor exposure.

This invention comprises novel compounds exhibiting one direct carbon to tin bond, one direct halogen to tin bond and two direct sulfur to tin bonds.

This invention also comprises halogen-containing polymers stabilized against the deteriorative effects of heat and light comprising a halogen-containing polymer and a stabilizing amount of a compound exhibiting one direct carbon to tin bond, one direct halogen to tin bond and two direct sulfur to tin bonds.

The novel compounds of this invention include those of the formula:

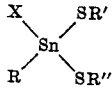

wherein X is a halogen atom and R, R', and R'' are hydrocarbons.

The novel compounds of this invention also include those of the formula:

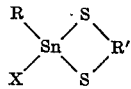

wherein R is a monovalent hydrocarbon radical exhibiting from one to 18 carbon atoms, R' is a divalent hydrocarbon radical exhibiting from one to 18 carbon atoms and X is a halogen atom.

The novel compounds of this invention may be prepared by reacting a compound of the formula $RSn(OH)_2X$ wherein R is a hydrocarbon radical selected from the group consisting of alkyl, alkenyl, cycloalkyl, aralkyl, aryl, and alkaryl and X is halide with one or more primary mercaptans, secondary mercaptans, tertiary mercaptans, mercapto alcohols, esters of mercapto alcohols, mercapto acids or mercapto acid esters.

The novel compounds of this invention thus include those of the formula:

In the formula R and R' are hydrocarbon radicals selected from the group consisting of alkyl, cycloalkyl, aralkyl, alkaryl, and aryl. R' may be selected from the same group as R. R' may also be a residue of a carboxylic acid ester —R''COOR'''. In these formulae R'', R''' (which may be the same as each other or different) may be selected from the same group as R and R' are selected from. In these formulae R and R' are hydrocarbon radicals selected from the group consisting of alkyl, cycloalkyl, aralkyl, alkaryl, and aryl, and X is a halogen atom selected from the group consisting of chlorine, bromine and iodine. When R or R' is alkyl, it may be a straight chain alkyl or a branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes alkyls having less than about 20 carbon atoms. When R or R' is cycloalkyl, it may typically be cyclopentyl, cyclohexyl, cycloheptyl, cyclooctyl, etc. When R or R' is aralkyl, it may typically be benzyl, β-phenylethyl, γ-phenylpropyl, β-phenylpropyl, etc. When R or R' is aryl, it may typically be phenyl, naphthyl, etc. When R or R' is alkaryl, it may typically be tolyl, xylyl, p-ethylphenyl, p-nonylphenyl, etc. R or R' may be inertly substituted, e.g., may bear a non-reactive substituent such as alkyl, aryl, cycloalkyl, aralkyl, alkaryl, ether, etc.

Typical novel compounds of this invention include:
monobutylmonochlorotin S,S' bis(lauryl mercaptide),
monobutylmonochlorotin S,S' bis(octyl mercaptide),
monobutylmonochlorotin S,S' bis(benzyl mercaptide),
monobutylmonochlorotin S,S' bis(xylyl mercaptide),
monobutylmonochlorotin S,S' bis(cyclohexyl mercaptide),
monobutylmonochlorotin S,S' bis(phenyl mercaptide),
monooctylmonochlorotin S,S' bis(lauryl mercaptide),
monooctylmonochlorotin S,S' bis(octyl mercaptide),
monooctylmonochlorotin S,S' bis(benzyl mercaptide),
monooctylmonochlorotin S,S' bis(xylyl mercaptide),
monooctylmonochlorotin S,S' bis(cyclohexyl mercaptide),
monocyclohexylmonochlorotin S,S' bis(lauryl mercaptide),
monomethylmonochlorotin S,S' bis(lauryl mercaptide),
monomethylmonochlorotin S,S' bis(benzyl mercaptide),
monomethylmonochlorotin S,S' bis(cyclohexyl mercaptide),
monomethylmonochlorotin S,S' bis(xylyl di-mercaptide),
monobutylmonochlorotin S,S' bis(isooctyl mercaptoacetate),
monooctylmonochlorotin S,S' bis(isooctyl mercaptoacetate),
monocyclohexylmonochlorotin S,S' bis(isooctyl mercaptoacetate), monomethylmonochlorotin S,S' bis(isooctyl mercaptoacetate), monophenylmonochlorotin S,S' bis(isooctyl mercaptoacetate), monophenylmonochlorotin S,S' bis(isooctyl mercaptoacetate), monobutylmonochlorotin S,S' bis(lauryl mercaptoacetate), monobutylmonochlorotin S,S' bis(benzyl mercaptoacetate), monobutylmonochlorotin S,S' bis(dodecyl thioglycollate), monobutylmonochlorotin S,S', bis(isooctyl mercaptopropionate), monooctylmonochlorotin S,S' bis(isooctyl mercaptopropionate), monocyclohexylmonochlorotin S,S' bis(isooctyl mercaptopropionate), monoethylmonochlorotin S,S' bis(isooctyl mercaptopropionate), monophenylmonochlorotin S,S' bis(isooctyl mercaptopropionate), monobutylmonochlorotin S,S' bis(lauryl mercaptopropionate), monobutylmonochlorotin S,S' bis(benzyl mercaptopropionate), monobutylmonochlorotin S,S' bis(isooctyl mercaptopropionate), and monobutylmonochlorotin S,S' bis(dodecyl mercaptopropionate).

The reactant $RSn(OH)_2X$ of this invention is prepared from the compound $RSnX_3$. Typical compounds $RSnX_3$ include the following: ethyltin trichloride, propyltin trichloride, n-butyltin trichloride, hexyltin trichloride, octyltin trichloride, phenyltin trichloride, o-tolyltin trichloride, benzyltin trichloride, butenyltin trichloride, ethynyltin trichloride, butyltin tribromide, and n-octyltin tribromide.

Compounds such as butyltin bromide dichloride may be employed. Preferably the compound $RSnX_3$ is a chloride and the preferred compounds may be n-butyltin trichloride and n-octyltin trichloride. The process for preparing the compound $RSn(OH)_2X$ includes maintaining an aqueous reaction mixture containing $RSnX_3$; adding to said reaction mixture a catalytic amount of a catalyst selected from the group consisting of aluminum chloride, titanium tetrachloride, bismuth trichloride, ferric chloride, cobalt chloride, nickel chloride, cadmium chloride, zirconium tetrachloride, boron trifluoride etherate, mercuric chloride, cupric chloride, trifluoroacetic acid, and zinc fluoride; thereby forming a precipitate containing $RSn(OH)_2X$; and recovering said precipitate from said aqueous reaction mixture. In practice, 10-200 parts, say 17.5 parts of $RSnX_3$ are added to 100 parts of aqueous reaction medium, preferably water. Catalyst, preferably aluminum chloride, is added in an amount of 0.1-10 parts, say 0.95 parts, and the solution allowed to stand for up to 2-3 hours. The solid precipitate which forms may be separated as by filtration and washed with 10-1000 parts, say 15 parts of water. After further washing with 6-60 parts, say 12 parts of, e.g., acetone, the precipitate may be air-dried. The product, typically obtained in an amount of 2.5 parts, is recovered from the filtrate.

The process for conducting the reaction

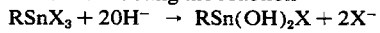
$$RSnX_3 + 2OH^- \rightarrow RSn(OH)_2X + 2X^-$$

includes maintaining an aqueous reaction mixture containing $RSnX_3$; adding to said aqueous reaction mixture base in an amount not stoichiometrically greater than the amount of $RSnX_3$ thereby forming a precipitate containing $RSn(OH)_2X$; and recovering said precipitate from said aqueous reaction mixture. In practice, 10-100 parts, say 20 parts of $RSnX_3$ may be added to 100 parts of aqueous reaction medium, preferably water. Base, preferably an alkali metal hydroxide such as potassium hydroxide, sodium hydroxide may be added thereto preferably as a solution containing 1-50 parts, say 10 parts of base in 100 parts of water. The amount of base added should not be stoichiometrically greater than, and preferably equal to, the amount of $RSnX_3$, i.e., two equivalents of base per mole of $RSnX_3$. The product $RSn(OH)_2X$ may precipitate and, preferably after standing for 4-12 hours be separated as by filtration. The precipitate may be washed with 50-500 parts, say 200 parts of water (which has been acidified preferably with hydrochloric acid) to pH of preferably about 2.0. The product may then be dried.

The process for preparing $RSn(OH)_2X$ when R is alkyl may include maintaining an aqueous reaction mixture containing $RSnX_3$; heating said reaction mixture thereby forming a precipitate containing $RSn(OH)_2X$ product; and recovering said precipitate from said aqueous reaction medium. In practice, 1-40 parts, say four parts of $RSnX_3$ may be added to 100 parts of aqueous reaction medium preferably water. The reaction mixture may then be heated to 70°-120° C, preferably to reflux temperature for 1-5 hours, preferably 2 hours. The product $RSn(OH)_2X$ may copiously precipitate and be recovered by filtration. The precipitate may be washed with 2-10 parts, say five parts of water (which preferably has been acidified preferably with hydrochloric acid to pH of preferably 2.4). The product may be further washed with acetone (acidified to pH of 2.4) and air-dried.

Typical reactants $RSn(OH)_2X$ include the following: ethyltin chloride dihydroxide, propyltin chloride dihydroxide, n-butyltin chloride dihydroxide, iso-butyltin chloride dihydroxide, hexyltin chloride dihydroxide, octyltin chloride dihydroxide, phenyltin chloride dihydroxide, o-tolyltin chloride dihydroxide, benzyltin chloride dihydroxide, butenyltin chloride dihydroxide, and ethynyltin chloride dihydroxide.

A reaction mechanism for the formation of the novel compounds of this invention is clearly illustrated by the following equations:

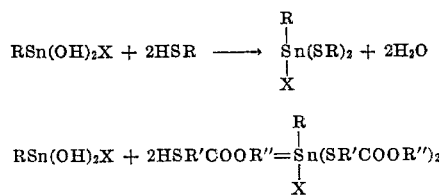

These equations graphically show that a reaction occurs between the mercapto radical and the compound $RSn(OH)_2X$ whereby water splits off and a chemical bond is formed between the tin and sulfur. These equations further illustrate the necessity of two molecules of the mercapto compound per mole of the compound $RSn(OH)_2X$ to obtain the desired reaction and the desired novel compound having a 2:1 ratio of sulfur to tin.

It is within the scope of this invention that pure, impure or commercial grades of the reactants may be employed satisfactorily. In general, pure compounds of the above formulae may be prepared from pure raw materials. However, these novel compounds may be diluted with innocuous, inert materials thereby permitting the use of technical grades of materials or intermediates in their preparation.

Any suitable reaction temperatures may be employed. It is ordinarily preferred to use room or slightly elevated temperatures of the order up to about 100° C. The exothermic nature of the reaction between the compound $RSn(OH)_2X$ and the sulfur containing compounds affords a considerable saving in the expenditure of external heat. The presence of water produced by the condensation reaction usually requires an additional heating or refluxing in order to strip said water from the reaction product, though it may be removed in any suitable matter.

The use of inert organic solvents as a medium for a reaction such as toluene, benzene, methyl alcohol, etc., is contemplated. The presence of such solvent facilitates the desired reaction. The solvent may be eliminated from the reaction product at the completion of the reaction by any suitable means. This may be accomplished by vaporizing the solvent under vacuum at elevated temperatures. Pressures of about 2 to 30 mm of mercury at temperatures of 75° to 160° C are satisfactory in affecting the removal of toluene or like solvent from the reaction product.

By these procedures, the novel compounds of this invention can be obtained in almost theoretical yields. These yields are indicative that it is not necessary to use an excess of either reactant, the total amount of starting materials being substantially utilized in the formation of the final reaction product.

Polymers or resins which may be stabilized by practice of this invention are halogen-containing organic polymers typically those which contain chlorine atoms bonded to the polymer chain. These polymers include polyvinyl chloride-type polymers, e.g., polyvinyl chloride, polyvinylidene chloride, etc. They may also include copolymers formed by the copolymerization of vinyl chloride or vinylidene chloride with each other or with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc.

The polymers may be either "rigid" or "flexible." When "Rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc., in addition to the resin and stabilizer.

In general the synthetic resins which can be stabilized according to this invention include the following polymers which may or may not be mixed with other stabilizers, additives, flameproofing agents, dyes, pigments, etc.:

a. Homopolymer of vinyl chloride,
b. Homopolymer of vinylidene chloride,
c. Copolymers of vinyl chloride and acrylonitrile,
d. Copolymers of vinylidene chloride and acrylonitrile,
e. Copolymers of vinylidene chloride, acrylonitrile and N-isopropylacrylamide,
f. Copolymers of vinyl chloride and vinyl acetate,
g. Copolymers of vinyl chloride, acrylonitrile, and N-butyrylacrylamide, h. Copolymers of vinyl chloride, methyl methacrylate and vinyl acetate,
i. Copolymers of vinyl chloride or vinylidene chloride with acrylonitrile and N-vinylpyridine,
j. Copolymers of vinyl chloride or vinylidene chloride with acrylonitrile mixed with a homopolymer of an N-alkylacrylamide e.g., N-iso-propylacrylamide, N-octylacrylamide, etc.),
k. Copolymers of vinyl chloride or vinylidene chloride with acrylontrile mixed with a homopolymer or copolymer of α-vinylpyrrolidone,
l. Copolymers of vinyl chloride or vinylidene copolymers of an N-alkylacrylamide and acrylonitrile,
m. Other copolymers and mixtures of homopolymers or copolymers of vinyl chloride and/or vinylidene chloride with or without other monoolefinically unsaturated polymerizable monomers containing from two to 20 or more carbon atoms, especially those containing from two to eight carbon atoms and no more than one nitrogen atom and no more than two oxygen atoms.

The methods for preparing the synthetic resins described above are well known and such methods and a great variety of such synthetic resins are described in the prior art. These synthetic resins are useful in preparing fibers, films, molding compositions, coating materials, wrapping materials, electrical insulation, fabrics, rope, plastic, pipe, paints, laminating materials for safety glass, adhesives, etc. Synthetic resins as stabilized in accordance with this invention are especially advantageous in synthetic fibers and products made therefrom such as rugs, wearing apparel, draperies, seat covers, upholstery, rope, cigarettes filters, etc. Resistance to weathering e.g., moisture and ultraviolet light) is especially important for items exposed to out of doors conditions. Resistance to ultraviolet light is also important for rugs, draperies, automobile seat covers, porch furniture upholstery and the like which may receive considerable sunlight.

The following examples are for illustration and are not to be construed as limiting the scope of the invention.

EXAMPLE 1

Preparation of monobutylmonochlorotin S,S' bis (isooctyl mercaptopropionate)

Monobutylmonochlorotin S,S' bis(isooctyl mercaptopropionate) was prepared by adding 318.9 grams (1.3 moles) of butylchlorotin dihydroxide and 567.8 grams (2.6 moles) of iso-octyl mercaptopropionate to one liter of benzene contained in a reaction vessel equipped with a stirrer, a thermometer and a reflux condenser. The foregoing mixture was heated with agitation to form an azeotrope at 83° C. The benzene solvent was vacuum stripped and impurities were separated from the product by filtration. The purified product exhibited a weight of 741 grams. Analysis of the product indicated the following:

| Elemental Percentage of | Calculated | Found |
|---|---|---|
| Sn | 18.36 | 18.32 |
| S | 9.93 | 9.58 |
| Cl | 5.49 | 5.20 |

EXAMPLE 2

Preparation of monobutylmonochlorotin S,S' bis(isooctyl mercaptoacetate)

Monobutylmonochlorotin S,S' bis(isooctyl mercaptoacetate) was prepared by adding 24.6 grams (0.10 moles) of butylchlorotin dihydroxide and 40.9 grams (0.20 moles) of isooctyl mercaptoacetate to 150 milliliters of benzene in a 300 milliliter reaction flask equipped with a stirrer, a thermometer, and a reflux condenser. The foregoing mixture was heated, refluxed for ninety minutes, and stripped of the benzene solvent. The resulting yellow purified product exhibited a weight of 57.3 grams and was analyzed as containing the following:

| Elemental Percentage of | Calculated | Found |
|---|---|---|
| Sn | 19.22 | 20.06 |
| S | 10.38 | 9.52 |
| Cl | 5.74 | 5.39 |
| Cl/Sn Atomic Ratio | 1.00 | 0.96 |

EXAMPLE 3

Preparation of monobutylmonochlorotin S,S' bis(lauryl mercaptide)

Monobutylmonochlorotin S,S' bis(lauryl mercaptide) was prepared by adding 46.4 grams (0.20 moles) of lauryl mercaptan and 24.6 grams (0.10 moles) of butylchlorotin dihydroxide to 130 milliliters of benzene in a 500-milliliter flask equipped with a stirrer, thermometer, and reflux condenser. The aforementioned mixture was refluxed for 2 hours at a temperature of 85° C. The benzene solvent was vacuum stripped and the product thus obtained was clarified by filtration. The product exhibited a weight of 66.9 grams, a 99.4 percent yield, and upon analysis the following characteristics:

| Elemental Percentage of | Calculated | Found |
|---|---|---|
| Sn | 17.80 | 17.73 |
| S | 9.52 | 9.53 |
| Cl | 5.26 | 4.90 |
| Cl/Sn Atomic Ratio | 1.00 | 0.92 |

EXAMPLE 4

Preparation of monobutylmonochlorotin S,S' bis(octadecyl mercaptoacetate)

Monobutylmonochlorotin S,S' bis(octadecyl mercaptoacetate) was prepared by adding 59.9 grams (0.163 moles) of octadecyl thioglycollate and 20.0 grams (0.0817 moles) of butyl-chlorotin dihydroxide to 200 milliliters of toluene. The process was conducted as was that of Example 1. The purified product exhibited a weight of 67.6 grams, a 93 percent yield, and as an elemental analysis, the following:

| Elemental Percentage of | Calculated | Found |
|---|---|---|
| Sn | 12.43 | 12.68 |
| S | 6.7 | 6.50 |
| Cl | 3.71 | 3.86 |

EXAMPLE 5

Preparation of monobutylmonochlorotin S,S' bis(cyclohexyl mercaptoacetate)

The novel compound monobutylmonochlorotin S,S' bis(cyclohexyl mercaptoacetate) was prepared by adding 36.4 grams (0.204 moles) of cyclohexyl thioglycollate and 25.0 grams (0.102 moles) of butylchlorotin dihydroxide to 200 milliliters of toluene in a 500-milliliter reaction vessel equipped with a stirrer, a thermometer, and a reflux condenser. The reaction mixture was heated to form an azeotrope and refluxed for one hour. The benzene solvent was removed by vacuum stripping and impurities were separated from the product by filtration. The product exhibited a weight of 56.6 grams and the following upon analysis:

| Elemental Percentage of | Calculated | Found |
|---|---|---|
| Sn | 20.8 | 20.86 |
| S (metal bonded) | 11.25 | 10.83 |
| Cl | 6.2 | 5.29 |

EXAMPLE 6

Preparation of monobutylmonochlorotin S,S' bis(dodecyl thioglycollate)

The novel compound monobutylmonochlorotin S,S' bis(dodecyl thioglycollate) was prepared by adding 54.1 grams (0.204 moles) of dodecyl thioglycollate and 25.0 grams (0.102 moles) of butyltin dihydroxide to 200 milliliters of toluene. The process of Example 1 was followed in obtaining a product exhibiting a weight of 69.6 grams, a yield of 99 percent of theoretical and upon elemental analysis the following:

| Elemental Percentage of | Calculated | Found |
| --- | --- | --- |
| Sn | 16.5 | 15.81 |
| S | 8.92 | 8.95 |
| Cl | 4.93 | 4.53 |

EXAMPLE 7

Preparation of monoctylmonochlorotin S,S' bis(isooctyl mercaptopropionate)

Monoctylmonochlorotin S,S' bis(isooctyl mercaptopropionate) was prepared by adding 60.3 grams of octylchlorotin dihydroxide and 87.4 grams of isooctyl mercaptopropionate to 1 liter of benzene contained in a reaction vessel equipped with a stirrer, a thermometer, and a reflux condenser. The foregoing mixture was heated with agitation to form an azeotrope at 73° C. The benzene solvent was vacuum stripped and impurities were separated from the product by filtration. The purified product exhibited a weight of 140 grams. Analysis of the product indicated the following:

| Elemental Percentage of | Calculated | Found |
| --- | --- | --- |
| Sn | 16.9 | 16.53 |
| S | 9.13 | 8.71 |
| Cl | 5.05 | 4.61 |

EXAMPLE 8

Preparation of monobutylmonochlorotin S,S'-p-xylylene α, α'-dimercaptide

Monobutylmonochlorotin S,S'-p-xylylene α, α'-dimercaptide was prepared by adding 25.0 grams (0.102 moles) of butylchlorotin dihydroxide and 17.7 grams (0.102 moles) of p-xylylene α, α'-dimercaptide to 1 liter of toluene contained in a reaction vessel equipped with a stirrer, a thermometer, and a reflux condenser. The foregoing mixture was heated with agitation to form an azeotrope at 100° C. The toluene solvent was vacuum stripped and impurities were separated from the product by filtration. The purified product exhibited a weight of 34.8 grams and a yield of 90 percent. Analysis of the product indicated the following:

| Elemental Percentage of | Calculated | Found |
| --- | --- | --- |
| Sn | 31.27 | 30.27 |
| S | 16.90 | 16.70 |
| Cl | 9.34 | 8.29 |

The novel compounds of this invention are useful as stabilizers for halogen-containing polymers. Typically the stabilizer is used in an amount of 0.05 to 10 parts by weight of 100 parts by weight of halogen-containing, typically vinyl chloride, resins. Preferably it may be used in the amount of 0.25–3 parts per 100 parts of halogen-containing resin. Thus the preferred heat-stable vinyl chloride polymer compositions of this invention comprise 100 parts by weight of a vinyl chloride polymer; a stabilizing amount, typically 0.05–10 parts of a novel compound of this invention.

The novel heat and light stable compositions of this invention may be formulated by such techniques as milling, dry blending, Banbury blending, or any other commonly employed formulating techniques. Whatever formulating technique be employed, it will be desirable to substantially complete and uniformly disperse the novel stabilizing compound throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degrees of stabilization attained in such systems may be considerably in excess of that previously attainable by any prior art stabilizer system.

Because of the outstanding properties of this novel stabilizer system, it is possible to effect stabilization with lower quantities and thereby to obtain a more effective system on a cost-performance basis.

To illustrate the unexpected and outstanding results which may be attained by practice of this invention, the following Examples 9, 10, and 11 are set forth wherein all parts are parts by weight unless otherwise indicated.

In Examples 9, 10, and 11, the rigid vinyl chloride polymer employed was that having a specific gravity of 1.40, a Shore Durometer D hardness of 80 and an ultimate tensile strength of about 7,000 psi, sold under the trademark Diamond 450.

The selected compositions were thoroughly blended by placing the polyvinyl chloride on a two-roller differential mill which was oil-heated to a temperature of 175° C together with the noted quantity of first and second stabilizers, and the mixture was milled for about 5 minutes. A continuous band of the composition formed around one of the rollers. This band was cut and the composition was removed from the hot roller as a continuous sheet. Squares of this material measuring 2.54 × 2.54 cm were cut for heat stability testing.

For the heat stability test, the squares were placed in an air oven regulated to maintain a temperature of 205° C. Samples of each composition were removed from the oven at 15-minute intervals and were rated visually as to color change and degradation according to the following scale:

7 — clear, water-white
6 — off-white
5 — slightest degree of yellowing
4 — definite yellow color
3 — deep yellow-brown color
2 — deep brown color
1 — dark brown to black color The length of time in minutes required to reach a value of 3 or less was recorded as the Heat Stability Value.

In Example 9 as hereinafter set forth, 100 parts of the vinyl chloride polymer was tested with the addition of 2 parts of the compound of Example 1, monobutylmonochlorotin S,S' bis(isooctyl mercaptopropionate). In Example 10, the novel compound of Example 2, monobutylmonochlorotin S,S' bis(isooctyl mercaptoacetate) was added in amount of 2.0 parts and no other stabilizer was present. In Example 11, the stabilizer was the novel compound of Example 3, monobutylmonochlorotin S,S' bis(lauryl mercaptide), present in amount of 2.0 parts and no other stabilizer was present.

The results of the heat stability tests are presented in Table I as follows:

TABLE I

| Example | Heat Stability Value in Minutes | Color After Milling |
| --- | --- | --- |
| 9 | 40 | 7 |
| 10 | 40 | 7 |
| 11 | 40 | 7 |

From Table I, it will be apparent that the compositions prepared in accordance with this invention are superior, having a Heat Stability Value of 40 minutes and a Color After Milling of 7. The experimental Examples 9, 10, and 11 show stabilization by compositions particularly characterized by low cost, low sulfur content, and substantially lower odor during milling.

It is clear from Examples 9, 10, and 11 that the Heat Stability Value of the novel product of this invention is outstanding. Furthermore, the Color After Milling of the novel product is very high, being rated numerically as 7, which is outstandingly superior.

Although this invention has been illustrated by reference to specific examples, the scope of this invention is limited solely by the scope of the appended claims.

I claim:

1. The process for preparing compounds exhibiting one direct carbon to tin bond, one direct halogen to tin bond and two direct sulfur to tin bonds which comprises reacting a compound $RSn(OH)_2X$ wherein R is a hydrocarbon and X is halogen with a sulfur containing compound of a formula selected from the group consisting of $R'(SH)_y$ and $HSR''COOR'''$ wherein R' is a hydrocarbon radical having a valence of y, R'' is a divalent hydrocarbon radical, R''' is a monovalent hydrocarbon radical and y is the integer 1 or 2 and recovering said novel compound.

2. The process of claim 1 wherein said sulfur containing compound of the formula $R'(SH)_y$ is an alkyl mercaptan of from one to 20 carbon atoms and y is 1.

3. The process of claim 1 wherein said sulfur containing compound is a dimercaptan HSR'SH wherein R' is a hydrocarbon.

4. The process of claim 3 wherein R' is aralkylene

5. The process of claim 3 wherein R' is alkylene.

6. The process of claim 1 wherein R is alkyl

7. The process of claim 1 wherein X is a chloride.

8. The process for preparing compounds exhibiting one direct carbon to tin bond, one direct halogen to tin bond and two direct sulfur to tin bonds which comprises maintaining an aqueous reaction mixture containing $RSnX_3$; adding to said aqueous reaction mixture a base in amount not stoichiometrically greater than the amount of $RSnX_3$ thereby forming a precipitate containing $RSn(OH)_2X$; recovering said precipitate from said aqueous reaction mixture, adding to said $RSn(OH)_2X$, thus recovered, a sulfur containing organic compound of a formula selected from the group consisting of $R'(SH)_y$ and $HSR''COOR'''$ wherein R' is a hydrocarbon radical having a valence of y, R'' is a divalent hydrocarbon radical, R''' is a monovalent hydrocarbon radical and y is the integer 1 or 2 thereby forming said novel compound and recovering said novel compound.

9. The process of claim 8 wherein said sulfur containing compound is of the formula RSH wherein R is a hydrocarbon.

10. The process of claim 8 wherein said sulfur containing compound is an ester of a sulfur containing organic acid.

11. The compound which has the formula:

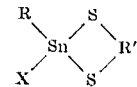

wherein R is a monovalent hydrocarbon radical exhibiting from one to 18 carbon atoms, R' is a divalent hydrocarbon radical exhibiting from one to 18 carbon atoms and X is a halogen atom.

12. The compound of claim 11 wherein R is alkyl.

13. The compound of claim 11 wherein R' is aralkylene.

14. The compound of claim 11 which is monobutyl-monochlorotin S,S'-p-xylyl-$\alpha,\alpha'$-dimercaptide.

15. The compound of claim 11 wherein R is alkyl and R' is alkylene.

16. The compound of claim 11 wherein X is chloride.

17. A compound in substantially pure form selected from those of the general formula

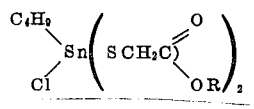

wherein R represents an isooctyl, octadecyl, cyclohexyl, or dodecyl radical.

18. A compound in substantially pure form selected from those of the general formula

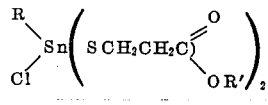

wherein R represents a butyl or an n-octyl radical and R' represents an isooctyl radical.

* * * * *